United States Patent
Shibai et al.

(10) Patent No.: US 12,153,306 B2
(45) Date of Patent: Nov. 26, 2024

(54) PLANAR LIGHT SOURCE AND LIQUID CRYSTAL DISPLAY DEVICE

(71) Applicant: NICHIA CORPORATION, Anan (JP)

(72) Inventors: Koki Shibai, Itano-gun (JP); Naoya Kashiwagi, Itano-gun (JP); Shimpei Sasaoka, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/192,583

(22) Filed: Mar. 29, 2023

(65) Prior Publication Data
US 2023/0314873 A1  Oct. 5, 2023

(30) Foreign Application Priority Data
Mar. 31, 2022  (JP) ................. 2022-058257

(51) Int. Cl.
*G02F 1/13357*  (2006.01)

(52) U.S. Cl.
CPC .. *G02F 1/133603* (2013.01); *G02F 1/133605* (2013.01)

(58) Field of Classification Search
CPC ......... G02F 1/133603; G02F 1/133605; G02F 1/133608
See application file for complete search history.

(56) References Cited

U.S. PATENT DOCUMENTS

| | | | | |
|---|---|---|---|---|
| 11,366,356 | B2* | 6/2022 | Ogawa | G02F 1/133603 |
| 11,650,457 | B2* | 5/2023 | Shibai | G02F 1/133603 |
| | | | | 349/61 |
| 2013/0128128 | A1* | 5/2013 | Ikuta | G02F 1/133605 |
| | | | | 349/67 |
| 2015/0198304 | A1* | 7/2015 | Ohkawa | G02F 1/133609 |
| | | | | 362/241 |

(Continued)

FOREIGN PATENT DOCUMENTS

| | | | | |
|---|---|---|---|---|
| CN | 112099265 A | * | 12/2020 | G02F 1/133605 |
| JP | 2005309093 A | | 11/2005 | |

(Continued)

OTHER PUBLICATIONS

Translation of CN 112099265 A (Year: 2020).*

*Primary Examiner* — Abdulmajeed Aziz
*Assistant Examiner* — Steven Y Horikoshi
(74) *Attorney, Agent, or Firm* — Hunton Andrews Kurth LLP

(57) ABSTRACT

A planar light source has a plurality of light sources, a substrate, and a partitioning member. The partitioning member includes a first member provided with first partitioned parts each having a first bottom part and first oblique parts surrounding the first bottom part that are arranged on the substrate in a matrix, and a second member provided with second partitioned parts each having a second bottom part and second oblique parts surrounding the second bottom part that are arranged on the substrate in a matrix. The first (Continued)

member further has first outer oblique parts overlapping the second oblique parts located along the outer edge of the second member on the first member side. The first bottom parts and the second bottom parts each have a light source disposition opening, and the light sources are individually disposed on the substrate exposed in the light source disposition openings.

23 Claims, 13 Drawing Sheets

(56) References Cited

U.S. PATENT DOCUMENTS

| | | | |
|---|---|---|---|
| 2017/0016584 A1* | 1/2017 | Snijkers | F21V 7/005 |
| 2018/0372300 A1* | 12/2018 | Ohkawa | F21V 7/05 |
| 2020/0096821 A1* | 3/2020 | Kyoukane | G02F 1/133606 |
| 2022/0350203 A1* | 11/2022 | Shibai | G02F 1/133608 |
| 2022/0404671 A1* | 12/2022 | Shibai | G02F 1/133603 |

FOREIGN PATENT DOCUMENTS

| | | |
|---|---|---|
| JP | 2011124196 A | 6/2011 |
| JP | 2011-203720 A | 10/2011 |
| JP | 2020-024875 A | 2/2020 |
| JP | 2020-024876 A | 2/2020 |
| WO | 2017150035 A1 | 9/2017 |

* cited by examiner

PLANAR LIGHT SOURCE AND LIQUID CRYSTAL DISPLAY DEVICE

CROSS REFERENCE TO RELATED APPLICATION

This application claims priority to Japanese Patent Application No. 2022-058257, filed on Mar. 31, 2022, the disclosure of which is hereby incorporated by reference in its entirety.

BACKGROUND

The present disclosure relates to a planar light source and a liquid crystal display device.

A planar light source which includes light sources arranged on a substrate in a matrix and a partitioning member having oblique parts individually surrounding the light sources has been known. Multiple partitioning members might be arranged on a single substrate when the outline of such a planar light source becomes large. In such a case, as a measure to reduce luminance non-uniformity, the application of a cover member in the portion where two partitioning members meet has been proposed. See, for example, Japanese Patent Publication No. 2020-024876.

SUMMARY

One object of the present disclosure is to reduce luminance non-uniformity in a planar light source provided with multiple members each having partitioned parts. Another object of the present disclosure is to provide a liquid crystal display device employing the planar light source.

A planar light source according to the present disclosure has a plurality of light sources, a substrate, and a partitioning member. The partitioning member includes a first member which has first partitioned parts arranged on the substrate in a first matrix each having a first bottom part and first oblique parts surrounding the first bottom part, and a second member which has second partitioned parts arranged on the substrate in a second matrix each having a second bottom part and second oblique parts surrounding the second bottom part. The first member further includes first outer oblique parts connected to upper edges of the first oblique parts located along an outer edge on a second member side and overlapping the second oblique parts located along an outer edge on a first member side. The first bottom parts and the second bottom parts each have a light source disposition opening, and the light sources are individually disposed on the substrate and exposed in the light source disposition openings.

According to an embodiment of the present disclosure, in a planar light source provided with multiple members each having partitioned parts, luminance non-uniformity can be reduced. Furthermore, a liquid crystal display device employing the planar light source can be provided.

EMBODIMENTS

Figure 1:
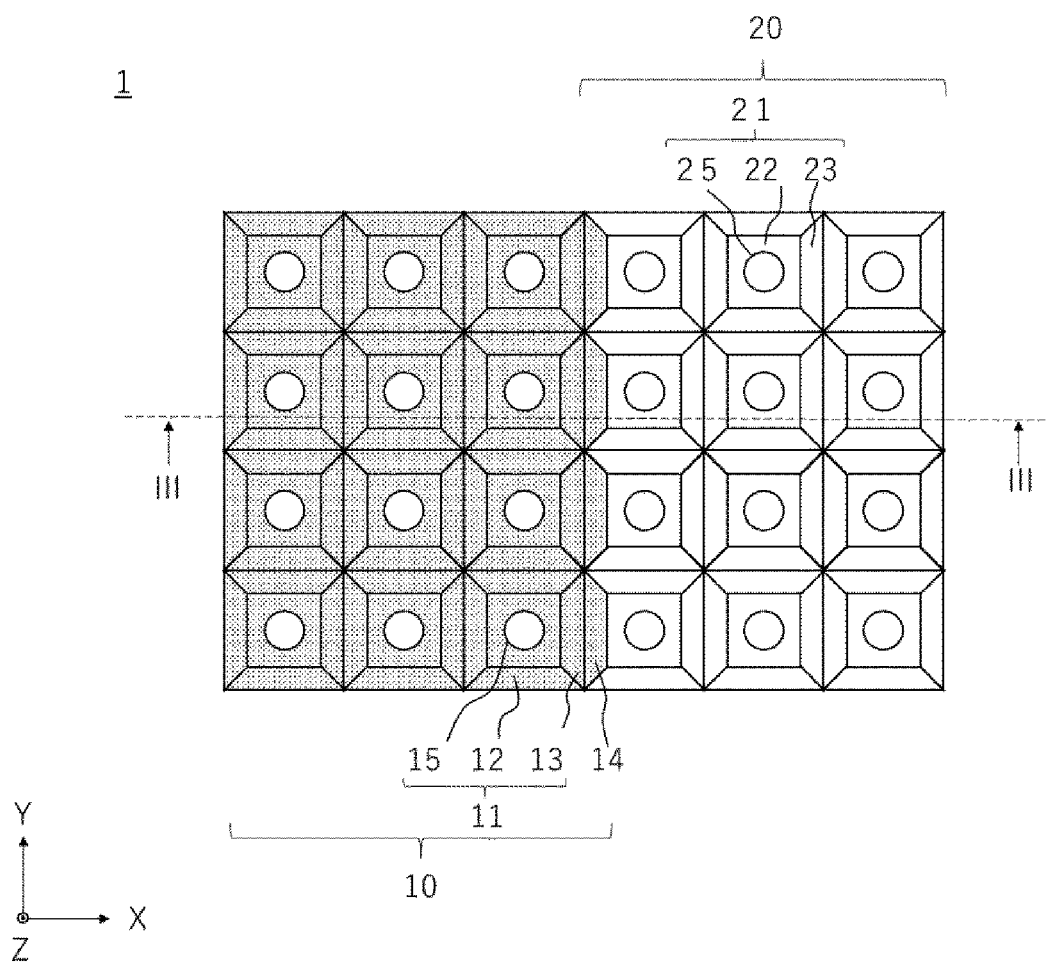
FIG. 1 is a top view (part 1) illustrating a partitioning member 1.

Certain embodiments of the present disclosure will be explained below with reference to the accompanying drawings. In the description below, terms indicating specific directions or positions (e.g., "upper," "lower," and other terms including and related to these) might be used. These terms, however, are merely used in order to make the disclosure in the drawings being referenced more easily understood, and the meanings of these terms are not intended to limit the technical scope of the present disclosure. The same reference numerals shown in a number of drawings designate the same or equivalent parts or members.

The embodiments described below illustrating planar light sources and the like are provided to give shape to the technical ideas of the present disclosure, and are not intended to limit the present disclosure. The sizes, shapes, and relative positions of, and materials for, the members explained in the description below are not intended to limit the scope of the present disclosure to only those described unless otherwise noted, and are intended for illustration purposes. Moreover, what is explained in relation to one embodiment is also applicable to other embodiments or their variations. The sizes of and relative positions of the members shown in the drawings might be exaggerated for clarity of explanation. Furthermore, for the purpose of not making the drawings excessively complex, schematic diagrams omitting certain elements might be used, or only a cut end face might be shown as a cross-sectional view.

First Embodiment

A planar light source according to a first embodiment has a plurality of light sources, a substrate, and a partitioning member. The light sources and the partitioning member are disposed on the substrate. The partitioning member is a member that functions as a reflector for the planar light source, and provides partitions for increasing the contrast between a region which is lit and a region which is not lit when local dimming is performed by allowing a portion of the planar light source to emit light.

Each element constituting the planar light source will be explained below. Subsequently, the details of the planar light source will be explained.

Partitioning Member 1

Figure 2:
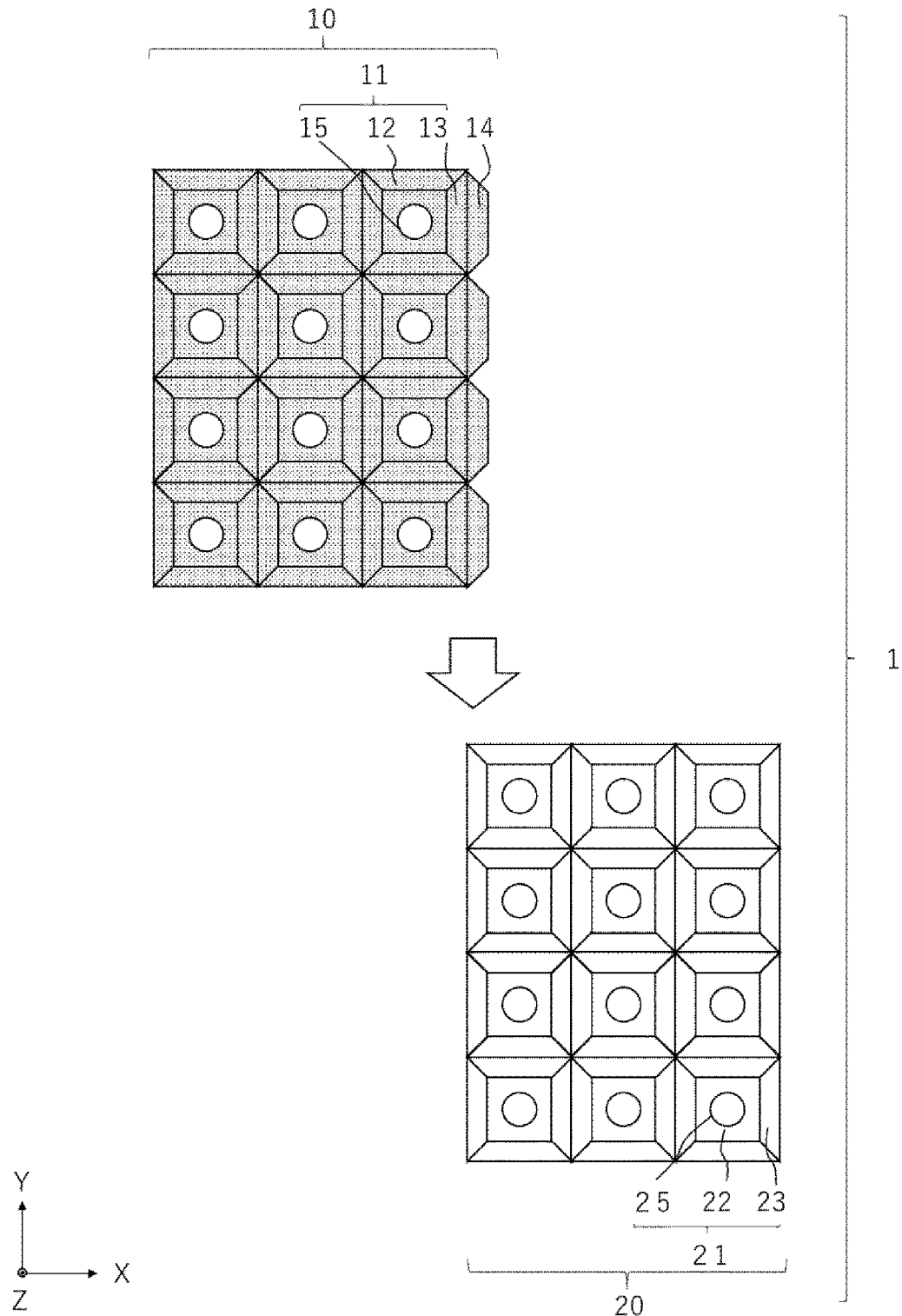
FIG. 2 is a top view (part 2) illustrating the partitioning member 1.
Figure 3:
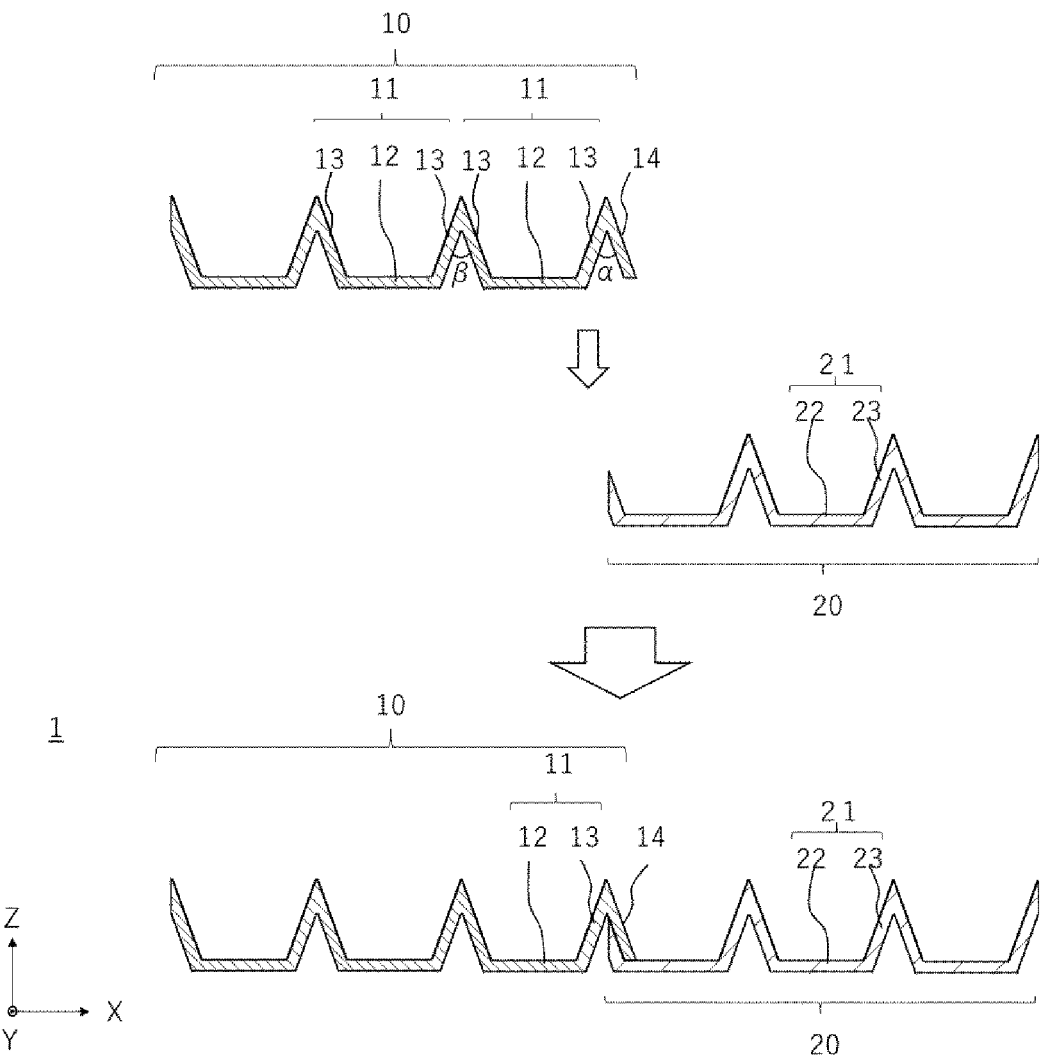
FIG. 3 is a cross-sectional view taken along line III-III in FIG. 1.

FIG. 1 is a top view (part 1) illustrating a partitioning member 1. FIG. 1 shows a state in which a first member 10 and a second member 20 overlap. FIG. 2 is a top view (part 2) of the partitioning member 1. FIG. 2 shows a state in which the first member 10 and the second member 20 do not overlap. FIG. 3 is a cross-sectional view taken along line in FIG. 1. FIG. 3 shows both the state in which the first member 10 and the second member 20 overlap and the state in which they do not overlap.

As shown in FIG. 1 to FIG. 3, the partitioning member 1 has a first member 10 and a second member 20. In the example shown in FIG. 1 to FIG. 3, the first member 10 and the second member 20 are arranged side by side in the X direction. The first member 10 is laid over a portion of the second member 20.

The first member 10 has first partitioned parts 11 arranged in a matrix, i.e., in rows and columns. The numbers of first partitioned parts 11 arranged in the row direction and the column direction may be the same or different. In the example shown in FIG. 1 and FIG. 2, in the top views, a plurality of square shaped first partitioned parts 11 are arranged in four rows and three columns. In the present specification, the row direction is the X direction, the column direction is the Y direction, and the direction perpendicular to the X and Y directions is the Z direction.

Each of the first partitioned parts 11 has a first bottom part 12, first oblique parts 13 surrounding the first bottom part 12, and a light source disposition opening 15 provided in the first bottom part 12.

In the example shown in FIG. 2, each first bottom part 12 is a square when viewed from above. The first oblique parts 13 are provided along the X+, X−, Y+, and Y− outer edges of each first bottom part 12. As shown in FIG. 3, the distance of the space between two opposing first oblique parts 13 interposing a first bottom part 12 decreases towards the lower end (the first bottom part).

A light source disposition opening 15 is a region in which a light source can be disposed. A light source is disposed on the substrate exposed in a light source disposition opening 15. Each light source disposition opening 15 is located in the central part of a first bottom part 12, and does not reach the lower edges of the first oblique parts 13. Each light source disposition opening 15 is, for example, circular when viewed from above. The same applies to the light source disposition openings 25 and 35 described later.

In the example shown in FIG. 3, with respect to two adjacent first partitioned parts 11, there is a space between the first oblique part 13 on the X− side of the first partitioned part 11 located on the X+ side and the first oblique part 13 on the X+ side of the first partitioned part 11 located on the X− side, and the upper edges of the two are connected. The same applies to the second partitioned parts 21 and the third partitioned parts 31 described later.

The first member 10 has first outer oblique parts 14 connected to the upper edges of the first oblique parts 13 located along the outer edge on the second member 20 side. The first outer oblique parts 14 overlap a portion of the second member 20. More specifically, the first outer oblique parts 14 overlap the second oblique parts 23 located along the outer edge of the second member on the first member 10 side among the second oblique parts 23 described later.

The first outer oblique parts 14 may be bonded to the second member 20 or not. In the case in which the first outer oblique parts 14 are bonded to the second member 20, an adhesive or the like can be used to bond the first oblique parts 14 and the second member 20. In the case in which the first outer oblique parts 14 are not bonded to the second member 20, the first outer oblique parts 14 may be in contact with the overlapped parts of the second member 20 in part or whole, or not. The same applies to the case in which the third member overlaps the second member and the case in which the third member overlaps the first member described later.

As shown in FIG. 2, when viewed from above, the first outer oblique parts 14 are connected entirely to the upper edges of the first oblique parts 13 located along the outer edge. In the example shown in FIG. 2, the top view shape of a first outer oblique part 14 and the top view shape of a first oblique part 13 are symmetrical using the upper edge of the first oblique part 13 as a line of symmetry.

In a cross section, the lower ends of the first outer oblique parts 14 may be spaced apart from or in contact with the upper faces of the second bottom parts 22 located along the outer edge on the first member side. As shown in FIG. 3, allowing the lower end of the first outer oblique part 14 to be in contact with the upper face of the second bottom part 22 can increase the light extraction efficiency when using the partitioning member as a reflector of a planar light source. Allowing the lower end of the first outer oblique part 14 to be in contact with the upper face of the second bottom part 22 can also increase the area of contact between the first outer oblique part 14 and the second member 20. This can deter the detachment of the first member 10 from the second member 20 in the case of bonding the first outer oblique parts 14 to the second member 20 using an adhesive. As shown in FIG. 3, the angle α formed by the first outer oblique part 14 and the first oblique part 13 connected at the upper edge is preferably equal to the angle β formed by two first oblique parts 13 which are connected at their upper edges. This can reduce the luminance non-uniformity among the first partitioned parts 11.

In the example shown in FIG. 3, the thickness of the first outer oblique part 14 is the same as the thickness of each first oblique part 13. It is not limited to this, however. The thickness of the first outer oblique part 14 can be smaller than the thickness of each first oblique part 13. The thickness here is the length in the direction orthogonal to the upper face of a first outer oblique part 14 or the upper face of a first oblique part 13.

As many first outer oblique parts 14 as the first oblique parts 13 located along the outer edge on the second member 20 side are provided. In the example shown in FIG. 2, four first oblique parts 13 are provided along the outer edge on the second member 20 side, and thus four first outer oblique parts 14 are provided.

The second member 20 has second partitioned parts 21 arranged in a matrix, i.e., in rows and columns. The numbers of second partitioned parts 21 arranged in the row direction and the column direction may be the same or different. In the example shown in FIG. 1 and FIG. 2, when viewed from above, a plurality of square shaped second partitioned parts 21 are arranged in four rows and three columns. The number of first partitioned parts 11 and the number of second partitioned parts 21 may be the same or different.

Each second partitioned part 21 includes a second bottom part 22, second oblique parts 23 surrounding the second bottom part 22, and a light source disposition opening 25 provided in the second bottom part 22.

In the example shown in FIG. 2, each first bottom part 12 is a square when viewed from above. Second oblique parts 23 are provided along the X+, X−, Y+, and Y− outer edges of each second bottom part 22. As shown in the example in FIG. 3, the distance of the space between two second oblique parts 13 interposing a second bottom part 22 decreases towards the lower end (the second bottom part 22).

Figure 4:
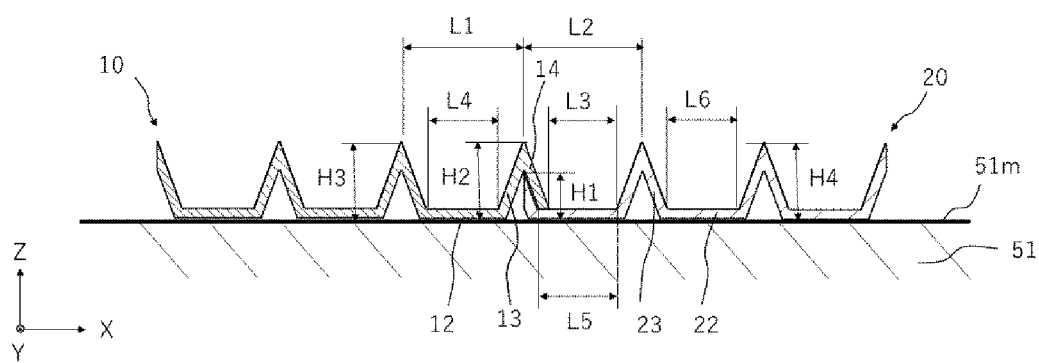
FIG. 4 is a cross-sectional view explaining the widths and other dimensions of partitioned parts.

FIG. 4 is a cross-sectional view explaining the widths and other dimensions of partitioned parts. In the example shown in FIG. 4, the partitioning member 1 is disposed on a substrate.

The distance between the upper edges of two opposing first oblique parts 13 that interpose a first bottom part 12 in the X direction is designated as L1. The distance between the upper edge of the first outer oblique part 14 and the upper edge of the second oblique part 23 that opposes the second oblique part 23 overlapped by the first outer oblique part 14 in the X direction (i.e., the second oblique part 23 on the X+ side of the second partitioned part 21 located along the outer edge on the first member 10 side) is designated as L2. L1 is preferably equal to L2.

In the case in which the lower end of the first outer oblique part 14 is in contact with the upper face of the second bottom part 22, the width L3 from the lower end of the first outer oblique part 14 to the lower edge of the second oblique part 23 that opposes the second oblique part 23 located along the outer edge on the first member 10 side is preferably equal to the width L4 of the first bottom part 12.

In the case in which the lower end of the first outer oblique part 14 is in contact with the upper face of the second bottom part 22, the width L3 from the lower end of the first outer oblique part 14 to the lower edge of the second oblique part 23 that opposes the second oblique part 23 located along the outer edge on the first member 10 side is preferably equal to the width L6 of the second bottom part 22 of the second partitioned part 21 adjacent to the second partitioned part 21 overlapped by the first outer oblique part 14.

In the case in which the lower end of the first outer oblique part 14 is in contact with the upper face of the second bottom part 22, the width L3 from the lower end of the first outer oblique part 14 to the lower edge of the second oblique part 23 that opposes the second oblique part 23 located along the outer edge on the first member 10 side is preferably smaller than the width L5 of the second bottom part 22 located along the outer edge on the first member 10 side.

In the present specification, "width" refers to a distance in the X direction.

The height H1 of the upper edge of the second oblique part 23 located along the outer edge on the first member 10 side is preferably smaller than the height H2 of the upper edge of the first outer oblique part 14.

The height H3 of the upper edge of each first oblique part 13 is preferably equal to the height H4 of the upper edge of each second oblique part 23. The height H2 of the upper edge of the first outer oblique part 14 is preferably equal to the height H3 of the upper edge of each first oblique part 13 and the height H4 of the upper edge of each second oblique part 23.

In the present specification, "height" refers to a distance from the upper face of the substrate 51 in the Z direction.

Setting the relationships among the heights H1 to H4 and among the widths L1 to L6 as described above can reduce luminance non-uniformity when using the partitioning member 1 as a reflector of a planar light source.

Luminance non-uniformity can be reduced when using the partitioning member 1 as a reflector for a planar light source because a portion of the first member 10 overlaps a portion of the second member 20 when viewed from above to reduce the occurrence of a gap between the first member 10 and the second member 20.

Suitable dimensional values and materials for the partitioning member will be described in detail later.

Figure 5:
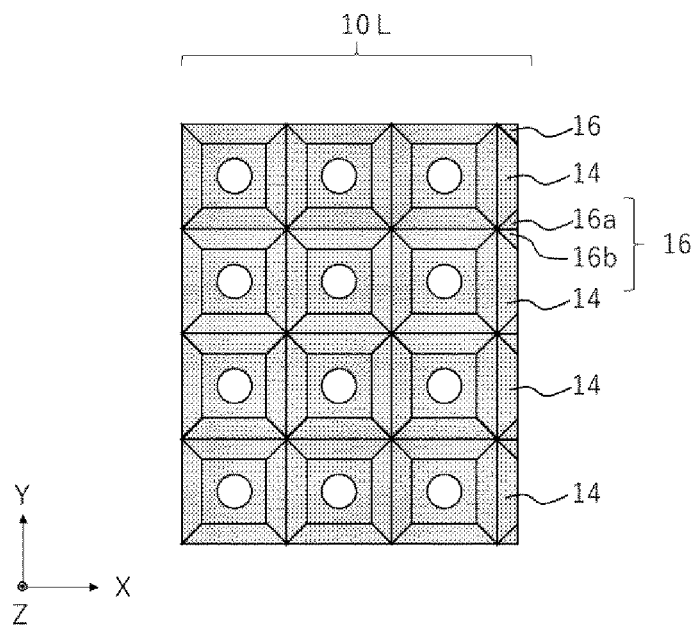
FIG. 5 is a top view illustrating a first member 10L.

FIG. 5 is a top view illustrating a first member 10L which is a variation of the first member 10. The first member 10L has first connecting oblique parts 16 in addition to the constituents of the first member 10 described above. A first connecting oblique part 16 is connected to both first outer oblique parts 14 that are adjacent to one another. The first connecting oblique parts 16 are laid over the second oblique parts 23 adjacent to the second oblique parts 23 located under the first outer oblique parts 14. Connecting the first outer oblique parts 14 with the first connecting oblique parts 16 can enhance the strength of the first outer oblique parts 14, thereby reducing the deformation of the first outer oblique parts 14. In this manner, during the expansion and contraction of the first member 10 and the second member 20 due to the heat generated when driving the light sources, the first outer oblique parts 14 can reduce the expansion and contraction of the first member 10 and the second member 20 so as not to allow the first member 10 and the second member 20 to separate from one another. The "second oblique parts 23 adjacent to the second oblique parts 23 located under the first outer oblique parts 14" refer to the second oblique parts 23 on the Y+ or Y− side of the second partitioned parts 21 located along the outer edge on the first member 10 side.

In the example shown in FIG. 5, each first connecting oblique part 16 connected to two adjacent first outer oblique parts 14 is composed of a first connecting oblique part 16a and a first connecting oblique part 16b. Each first connecting oblique part 16a is connected to the first outer oblique part 14 on the Y+ side of two adjacent first outer oblique parts 14. Each first connecting oblique part 16a is oblique to a first bottom part 12, and overlaps the second oblique part 23 located under the first connecting oblique part 16a. Each first connecting oblique part 16b is connected to the first outer oblique part 14 on the Y− side of two adjacent first outer oblique parts 14. Each first connecting oblique part 16b is oblique to a first bottom part 12, and overlaps the second oblique part 23 located under the first connecting oblique part 16b.

In the example shown in FIG. 5, the maximum length of a first connecting oblique part 16 in the X direction is equal to the maximum length of a first outer oblique part 14. It is not limited to this, however. The maximum length of a first connecting oblique part 16 in the X direction can be larger than the maximum length of a first outer oblique part 14 and smaller than the length of a second partitioned part 21.

The height of the upper edge of a first connecting oblique part 16 is preferably equal to the height of the upper edge of a first outer oblique part 14. The height of the upper edge of the second oblique part 23 located under a first outer oblique part 14 may be equal to or smaller than the height of the upper edge of the first outer oblique part 14.

In the case in which the second member and/or the third member described later have outer oblique parts, the second member and/or the third member may have connecting oblique parts.

Figure 6:
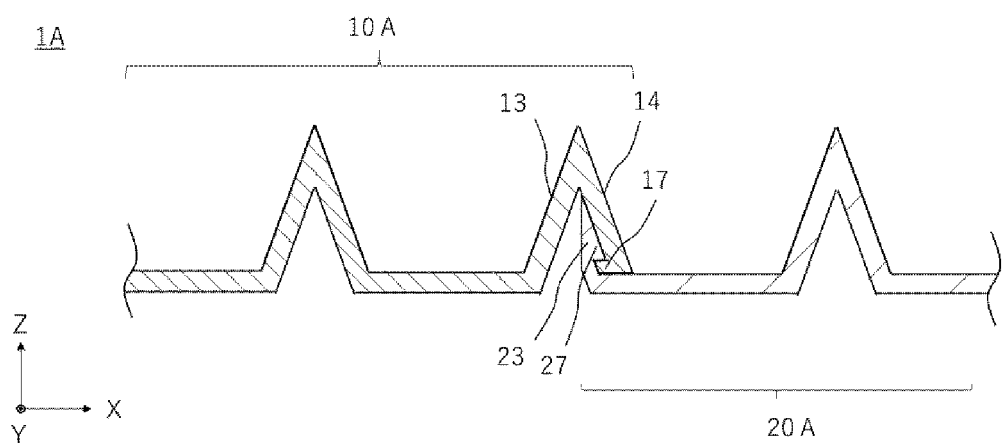
FIG. 6 is a cross-sectional view illustrating a partitioning member 1A.

FIG. 6 is a cross-sectional view illustrating a partitioning member 1A which is a variation of the partitioning member 1. The partitioning member 1A has a first member 10A and a second member 20A. The first member 10A has first projected parts 17 in the first outer oblique parts 14 in addition to the constituents of the first member 10 described above. The first projected parts 17 project in the X− direction from the faces of the first outer oblique parts 14 that oppose the second oblique parts 23 overlapped by the first outer oblique parts 14. The second member 20A has second projected parts 27 in the second oblique parts 23 located along the outer edge on the first member 10A side in addition to the constituents of the second member 20 described above. The second projected parts 27 project in the X+ direction from the second oblique parts 23 that oppose the first outer oblique parts 14. The first projected parts 17 are interposed between the second projected parts 27 and the second bottom parts 22. This can reduce the separation of the first member 10A from the second member 20A during the expansion and contraction of the partitioning member 1A.

Figure 7:
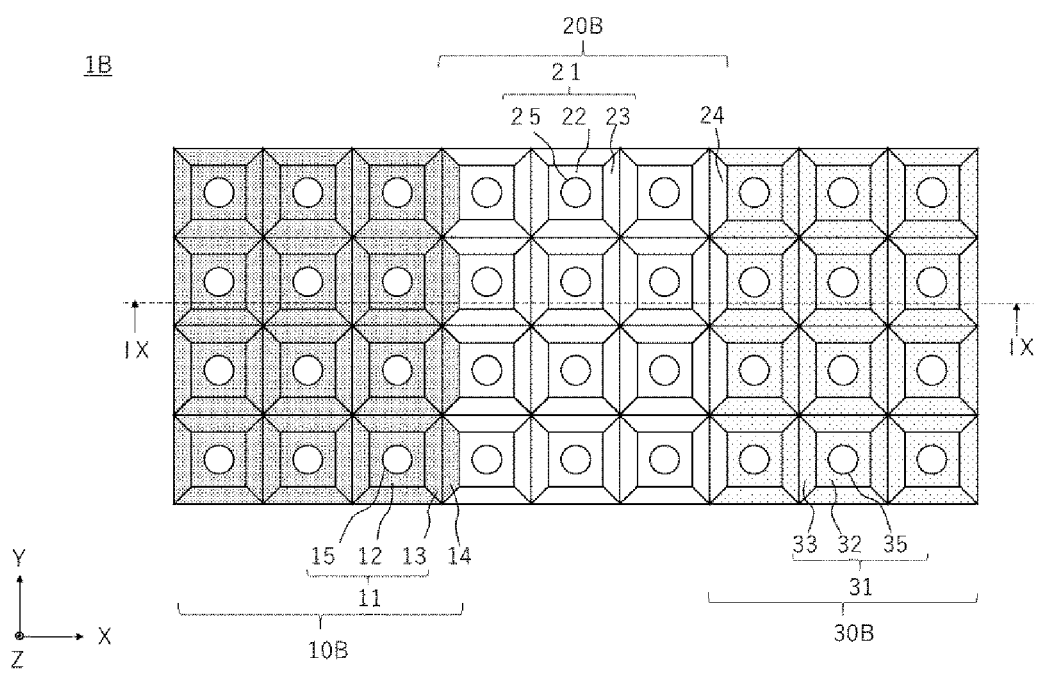
FIG. 7 is a top view (part 1) illustrating a partitioning member 1B.
Figure 8:
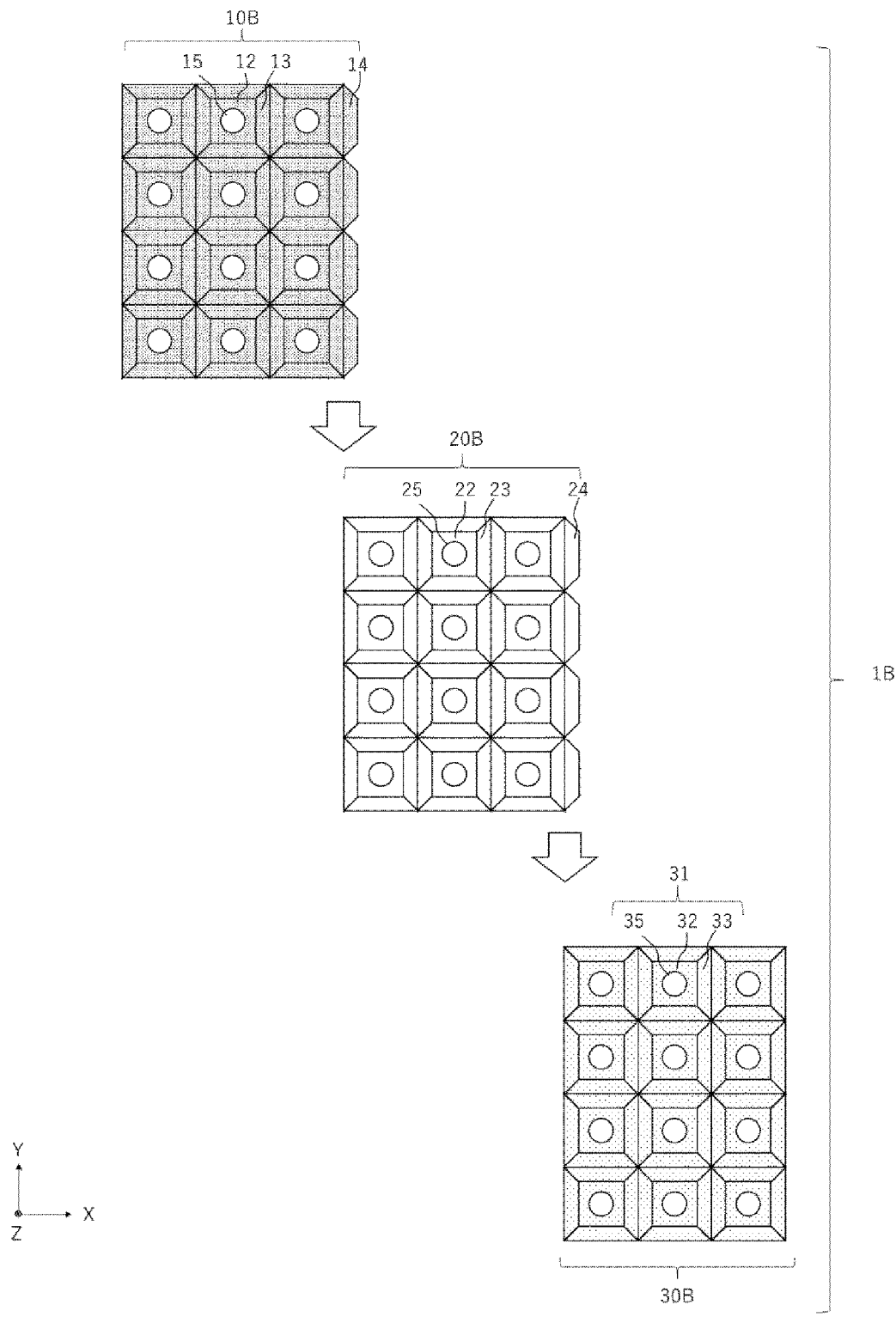
FIG. 8 is a top view (part 2) illustrating the partitioning member 1B.
Figure 9:
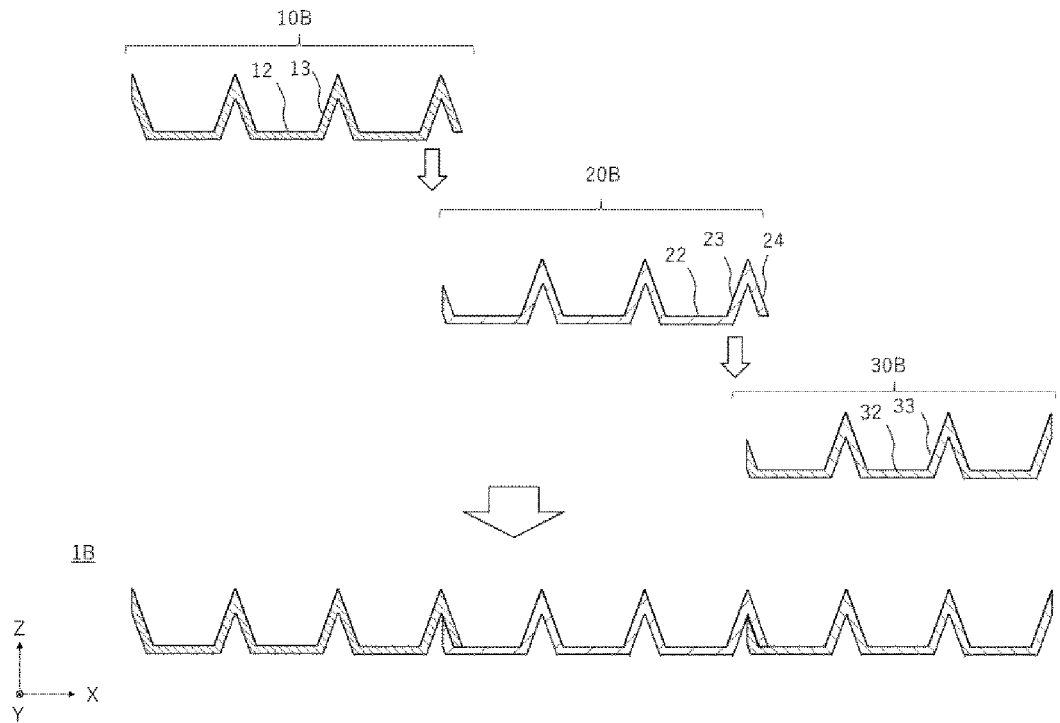
FIG. 9 is a cross-sectional view taken along line IX-IX in FIG. 7.

FIG. 7 is a plan view (part 1) illustrating a partitioning member 1B which is a variation of the partitioning member 1. FIG. 7 shows a state in which a first member 10B, a second member 20B, and a third member 30B overlap. FIG. 8 is a plan view (part 2) illustrating the partitioning member 1B. FIG. 8 shows a state in which the first member 10B, the second member 20B, and the third member 30B do not overlap. FIG. 9 is a cross-sectional view taken along line IX-IX in FIG. 7. FIG. 9 shows both the state in which the first member 10B, the second member 20B, and the third member 30B overlap and the state in which they do not overlap.

As shown in FIG. 7 to FIG. 9, the partitioning member 1B has a first member 10B, a second member 20B, and a third member 30B. In the example shown in FIG. 7 to FIG. 9, the first member 10B, the second member 20B, and the third member 30B are successively arranged in the X+ direction. The first member 10B is laid over a portion of the second member 20B, and the second member 20B is laid over a portion of the third member 30B.

In the partitioning member 1B, the first member 10B is similar to the first member 10 described above. The second member 20B has second outer oblique parts 24 in addition to the constituents of the second member 20 described above. The second outer oblique parts 24 are connected to the upper edges of the second oblique parts 23 located along the outer edge on the later described third member 30B side, overlapping the third oblique parts 33 located along the outer edge on the second member 20B side.

As shown in FIG. 8, when viewed from above, the second outer oblique parts 24 are connected entirely to the upper edges of the second oblique parts 23 located along the outer edge.

In a cross section, the second outer oblique parts 24 may overlap the third oblique parts 33 located along the outer edge on the second member 20B side in part or whole. In a cross section, the lower ends of the second outer oblique parts 24 are preferably in contact with the upper faces of the third bottom parts 32 located along the outer edge on the second member side.

In a cross section, the angle formed by a second outer oblique part 24 and the second oblique part 23 connected at the upper edge is preferably the same as the angle formed by two second oblique parts 23 connected at the upper edges.

The top view shape, the thickness, and the number of second outer oblique parts 24 are similar to those of the first outer oblique parts 14.

The third member 30B includes third partitioned parts 31 arranged in a matrix, i.e., in rows and columns. The numbers of third partitioned parts 31 arranged in the row direction and the column direction may be the same or different. In the example shown in FIG. 7 and FIG. 8, a plurality of square shaped third partitioned parts 31 are arranged in four rows and three columns. The numbers of the first partitioned parts 11, the second partitioned parts 21, and the third partitioned parts 31 may be the same or different. The same applies to the third members 30C and 30D described later.

Each third partitioned part 31 includes a third bottom part 32, third oblique parts 33 surrounding the third bottom part 32, and a light source disposition opening 35 provided in the third bottom part 32. The same applies to the third members 30C and 30D described later.

In the example shown in FIG. 8, each third bottom part 32 is, for example, a square when viewed from above. Third oblique parts 33 are provided along the X+, X−, Y+, and Y− edges of each third bottom part 32. As shown in the example in FIG. 9, the distance of the space between two opposing third oblique parts 33 decreases towards the lower end (the third bottom part 32).

The distance in the X direction between the upper edges of two opposing second oblique parts 23 which interpose a second bottom part 22 is preferably equal to the distance in the X direction between the upper edge of a second outer oblique part 24 and the upper edge of the third oblique part 33 that opposes the third oblique part 33 overlapped by the second outer oblique part 24. The "third oblique part 33 that opposes the third oblique part 33 overlapped by the second outer oblique part 24" refers to the third oblique part 33 on the X+ side of the third partitioned part 31 located along the outer edge on the second member 20 side.

In the case in which the lower end of a second outer oblique part 24 is in contact with the upper face of a third bottom part 32, the width from the lower end of the second outer oblique part 24 to the lower edge of the third oblique part 33 that opposes the third oblique part 33 overlapped by the second outer oblique part 24 is preferably equal to the width of a second bottom part 32.

In the case in which the lower end of a second outer oblique part 24 is in contact with the upper face of a third bottom part 32, the width from the lower end of the second outer oblique part 24 to the lower edge of the third oblique part 33 that opposes the third oblique part 33 overlapped by the second outer oblique part 24 is preferably equal to the width of the third bottom part 32 of the third partitioned part 31 adjacent to the third partitioned part 31 overlapped by the second outer oblique part 24.

In the case in which the lower end of a second outer oblique part 24 is in contact with the upper face of a third bottom part 32, the width from the lower end of the second outer oblique part 24 to the lower edge of the third oblique part 33 that opposes the third oblique part 33 overlapped by the second oblique part 24 is preferably smaller than the width of a third bottom part 32 located along the outer edge on the second member 20B side.

The height of the upper edge of a third oblique part 33 located along the outer edge on the second member 20B side is preferably smaller than the height of the upper edge of a second outer oblique part 24.

The height of the upper edge of a second oblique part 23 is preferably equal to the height of the upper edge of a third oblique part 33.

Setting the relationships among the widths and among the heights as described above can reduce luminance non-uniformity when using the partitioning member 1B as a reflector of a planar light source.

Figure 10:
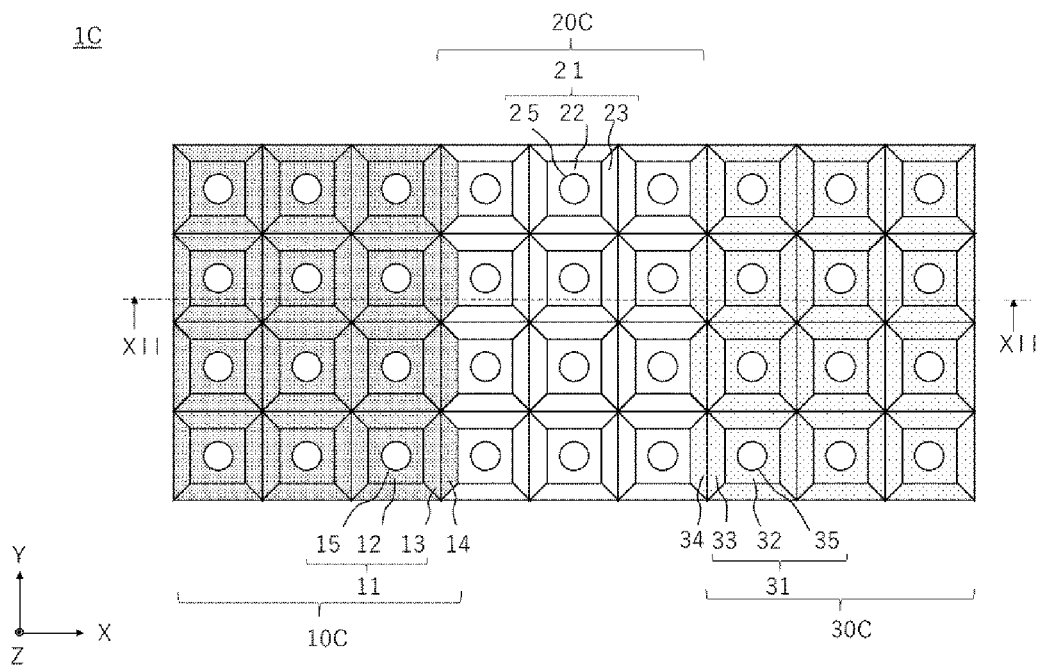
FIG. 10 is a top view (part 1) illustrating a partitioning member 1C.
Figure 11:
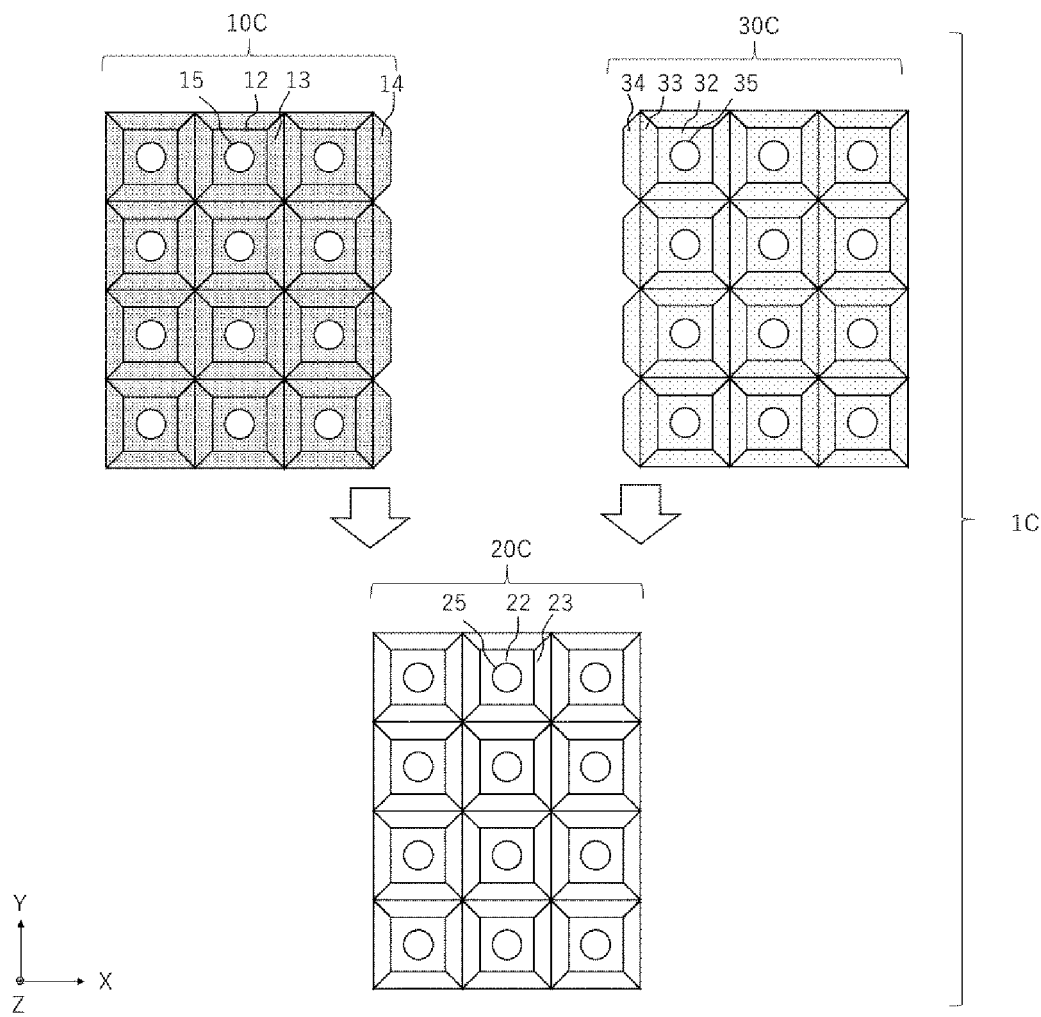
FIG. 11 is a top view (part 2) illustrating the partitioning member 1C.
Figure 12:
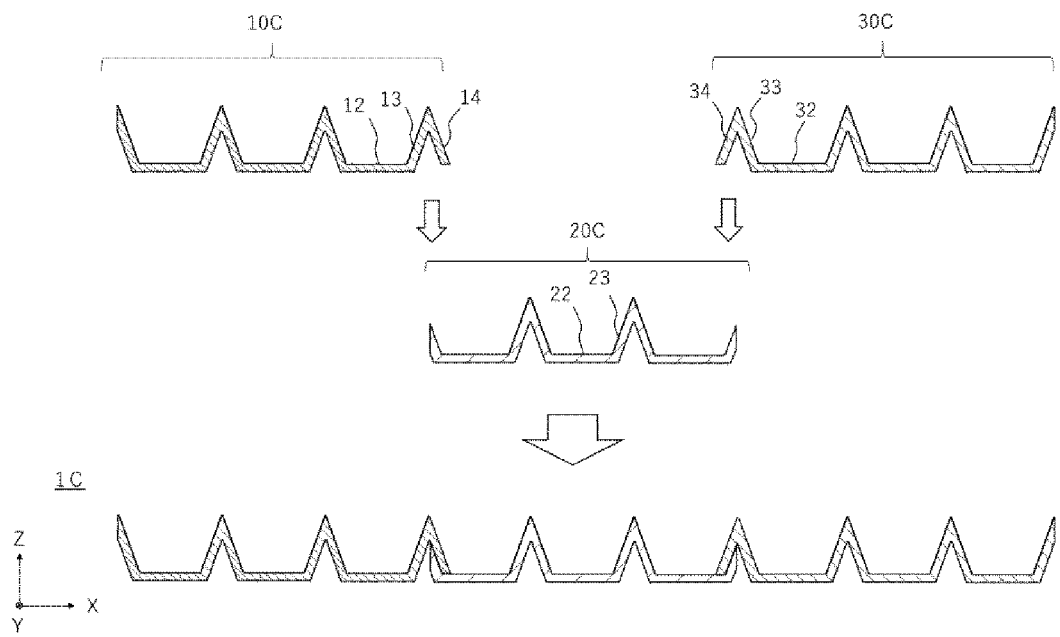
FIG. 12 is a cross-sectional view taken along line XII-XII in FIG. 10.

FIG. 10 is a plan view (part 1) illustrating a partitioning member 1C which is a variation of the partitioning member 1. FIG. 10 shows a state in which a first member 10C, a second member 20C, and a third member 30C overlap. FIG. 11 is a plan view (part 2) illustrating the partitioning member 1C. FIG. 11 shows a state in which the first member 10C, the second member 20C, and the third member 30C do not overlap. FIG. 12 is a cross-sectional view taken along line XII-XII in FIG. 10. FIG. 12 shows both the state in which the first member 10C, the second member 20C, and the third member 30C overlap and the state in which they do not overlap.

As shown in FIG. 10 to FIG. 12, the partitioning member 1C has a first member 10C, a second member 20C, and a third member 30C. In the example shown in FIG. 10 to FIG. 12, the first member 10C, the second member 20C, and the third member 30C are successively arranged in the X+ direction. The first member 10C is laid over a portion of the second member 20C, and the third member 30C is laid over a portion of the second member 20C.

In the partitioning member 1C, the first member 10C and the second member 20C are similar to the first member 10 and the second member 20 described above. The third member 30C has third outer oblique parts 34 in addition to the constituents of the third member 30B described above. The third outer oblique parts 34 are connected to the upper edges of the third oblique parts 33 located along the outer edge on the second member 20C side, overlapping the second oblique parts 23 located along the outer edge on the third member 30C side.

In the example shown in FIG. 11, in the top view, the third outer oblique parts 34 are connected entirely to the upper edges of the third oblique parts 33 located along the outer edge.

In a cross section, the third outer oblique parts 34 may overlap the second oblique parts 23 located along the outer edge on the third member 30C side in part or whole. In a cross section, the lower ends of the third outer oblique parts 34 are preferably in contact with the upper faces of the second bottom parts 22 located along the outer edge on the third member side.

In a cross section, the angle formed by a third outer oblique part 34 and the third oblique part 33 connected at the upper edge is preferably equal to the angle formed by two three oblique parts 33 connected at the upper edges.

The top view shape, the thickness, and the number of third outer oblique parts 34 are similar to those of the first outer oblique parts 14.

The distance in the X direction between the upper edges of two opposing third oblique parts 33 which interpose a third bottom part 32 is preferably equal to the distance in the X direction between the upper edge of a third outer oblique part 34 and the upper edge of the second oblique part 23 that opposes the second oblique part 23 overlapped by the third outer oblique part 34. The "second oblique part 23 that opposes the second oblique part 23 overlapped by the third outer oblique part 34" refers to the second oblique part 23 on the X− side of the second partitioned part 21 located along the outer edge on the third member 30 side.

In the case in which the lower end of a third outer oblique part 34 is in contact with the upper face of a second bottom part 22, the width from the lower end of the third outer oblique part 34 to the lower edge of the second oblique part 23 that opposes the second oblique part 23 located along the outer edge on the third member 30C side is preferably equal to the width of a third bottom part 32.

In the case in which the lower end of a third outer oblique part 34 is in contact with the upper face of a second bottom part 22, the width from the lower edge of the third outer oblique part 34 to the lower edge of the second oblique part 23 that opposes the second oblique part 23 located along the outer edge on the third member 30C side is preferably equal to the width of the second bottom part 22 of the second partitioned part 21 adjacent to the second partitioned part 21 overlapped by the third outer oblique part 34.

In the case in which the lower end of a third outer oblique part 34 is in contact with the upper face of a second bottom part 22, the width from the lower edge of the third outer oblique part 34 to the lower edge of the second oblique part 23 that opposes the second oblique part 23 located along the outer edge on the third member 30C side is preferably smaller than the width of the second bottom part 22 located along the outer edge on the third member 30C side.

The height of the upper edge of a second oblique part 23 located along the outer edge on the third member 30C side is preferably smaller than the height of the upper edge of a third outer oblique part 34.

The height of the upper edge of a second oblique part 23 is preferably equal to the height of the upper edge of a third oblique part 33.

Setting the relationships among the widths and among the heights as described above can reduce luminance non-uniformity when using the partitioning member 1C as a reflector of a planar light source.

Figure 13:
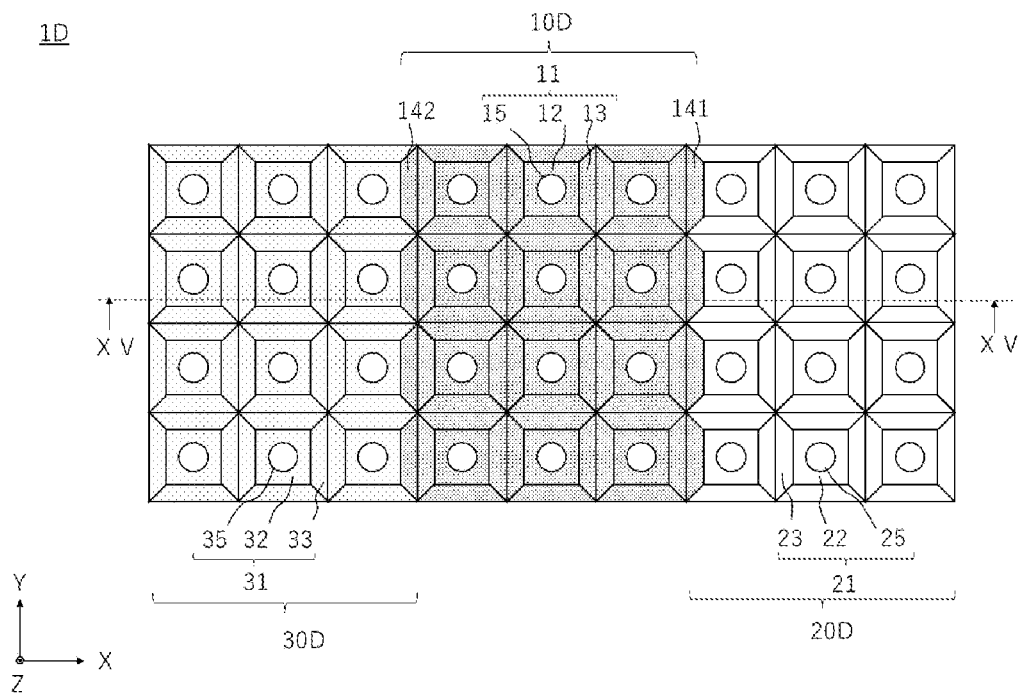
FIG. 13 is a top view (part 1) illustrating a partitioning member 1D.
Figure 14:
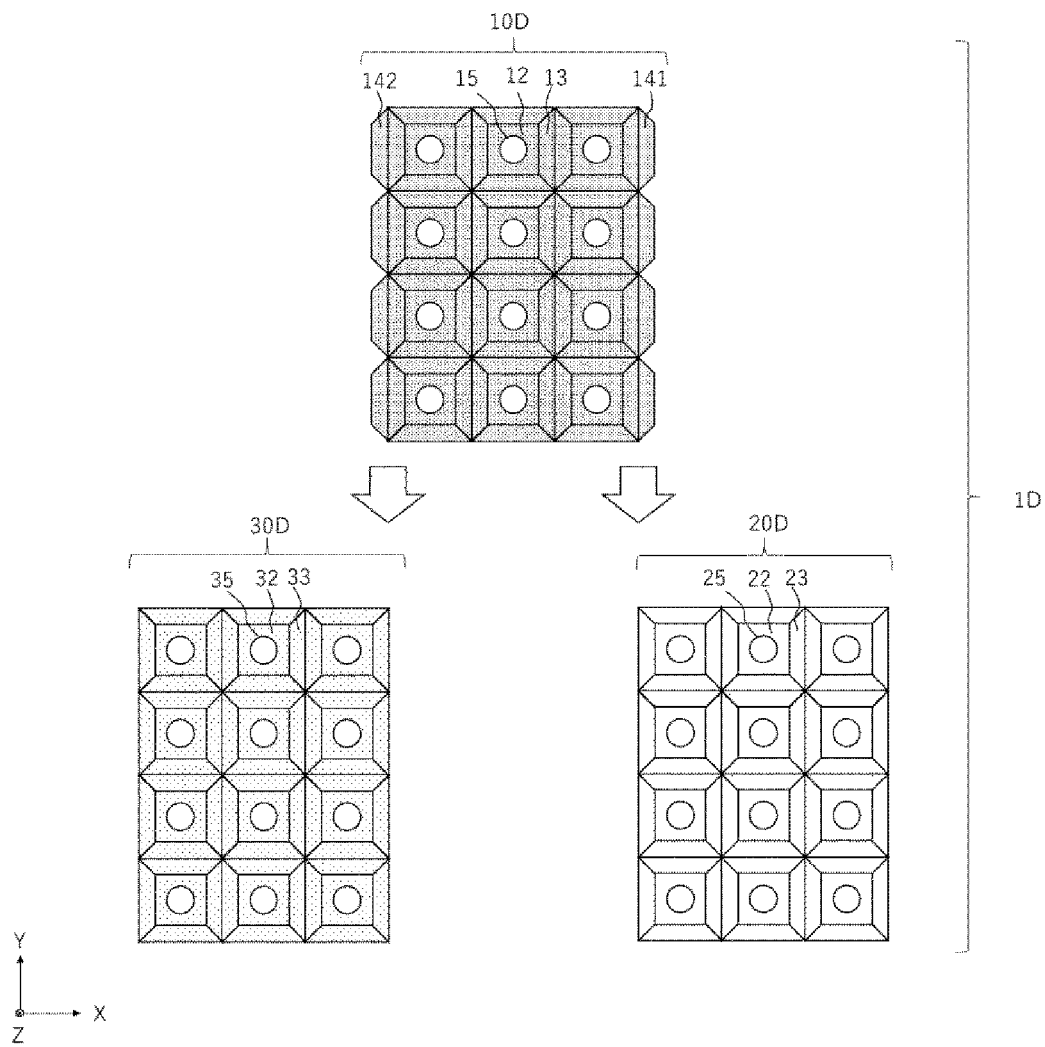
FIG. 14 is a top view (part 2) illustrating the partitioning member 1D.
Figure 15:
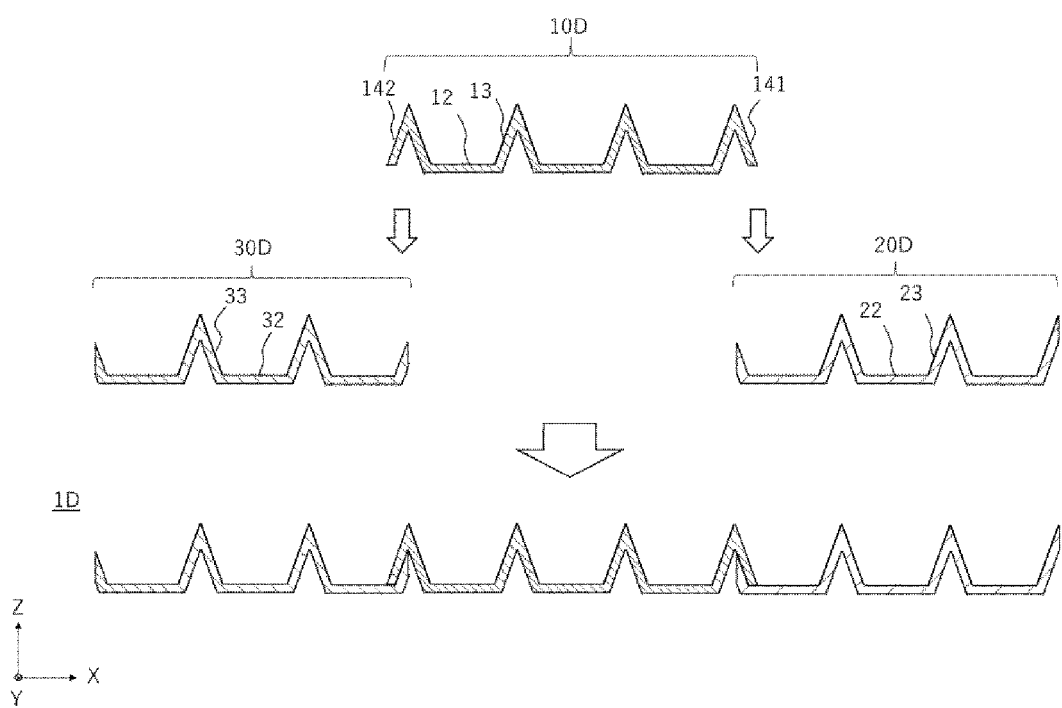
FIG. 15 is a cross-sectional view taken along line XV-XV in FIG. 13.

FIG. 13 is a plan view (part 1) illustrating a partitioning member 1D which is a variation of the partitioning member 1. FIG. 13 shows a state in which a first member 10D, a second member 20D, and a third member 30D overlap. FIG. 14 is a plan view (part 2) illustrating the partitioning member 1D. FIG. 14 shows a state in which the first member 10D, the second member 20D, and the third member 30D do not overlap. FIG. 15 is a cross-sectional view taken along line XV-XV in FIG. 13. FIG. 15 shows both the state in which the first member 10D, the second member 20D, and the third member 30D overlap and the state in which they do not overlap.

As shown in FIG. 13 to FIG. 15, the partitioning member 1D has a first member 10D, a second member 20D, and a third member 30D. In the example shown in FIG. 13 to FIG. 15, the third member 30D, the first member 10D, and the second member 20D are successively arranged in the X+ direction. The first member 10D is laid over a portion of the second member 20D and a portion of the third member 30D.

In the partitioning member 1D, the first member 10D has first outer oblique parts located along the outer edge on the third member 30D side in addition to the constituents of the first member 10 described above. The first member 10D of the partitioning member 1D has first outer oblique parts 141 located along the X+ side outer edge of the first member 10D (on the second member 20D side) and first outer oblique parts 142 located along the X− side outer edge of the first member 10D (on the third member 30D side).

The first outer oblique parts 141, as explained with reference to the partitioning member 1, are connected to the upper edges of the first oblique parts 13 located along the outer edge on the second member 20D side, overlapping the second oblique parts 23 located along the outer edge on the first member 10D side. The first outer oblique parts 142 are connected to the upper edges of the first oblique parts 13 located along the outer edge on the third member 30D side, overlapping the third oblique parts 33 located along the outer edge on the first member 10D side.

The second member 20D is similar to the second member 20 described above. The third member 30D is similar to the third member 30B described above.

As shown in FIG. 14, when viewed from above, the first outer oblique parts 142 are connected entirely with the upper edges of the first oblique parts located along the outer edge.

In a cross section, the first outer oblique parts 142 may overlap the third oblique parts 33 located along the outer edge on the first member 10D side in part or whole. In a cross section, the lower ends of the first outer oblique parts 142 are preferably in contact with the upper faces of the third bottom parts 32 located along the outer edge on the first member side.

In a cross section, the angle formed by a first outer oblique part 142 and the first oblique part 13 connected at the upper edge is preferably equal to the angle formed by two first oblique parts 13 connected at the upper edges.

The top view shape, the thickness, and the number of first outer oblique parts 142 are similar to those of the first outer oblique parts 14.

The first outer oblique parts 141 are similar to the first outer oblique parts 14.

The distance in the X direction between the upper edges of two opposing first oblique parts 13 which interpose a first bottom part 12 is preferably equal to the distance in the X direction between the upper edge of a first outer oblique part 142 and the upper edge of the third oblique part 33 that opposes the third oblique part 33 overlapped by the first outer oblique part 142. The "third oblique part 33 that opposes the third oblique part 33 overlapped by the first outer oblique part 142" refers to the third oblique part 33 on the X− side of the third partitioned part 31 located along the outer edge on the first member 10D side.

In the case in which the lower end of a first outer oblique part 142 is in contact with the upper face of a third bottom part 32, the width from the lower end of the first outer oblique part 142 to the lower edge of the third oblique part 33 that opposes the third oblique part 33 overlapped by the first outer oblique part 142 is preferably equal to the width of a first bottom part 12.

In the case in which the lower end of a first outer oblique part 142 is in contact with the upper face of a third bottom part 32, the width from the lower end of the first outer oblique part 142 to the lower edge of the third oblique part 33 that opposes the third oblique part 33 overlapped by the first outer oblique part 142 is preferably equal to the width of the third bottom part 32 of the third partitioned part 31 adjacent to the third partitioned part 31 overlapped by the first outer oblique part 142.

In the case in which the lower end of a first outer oblique part 142 is in contact with the upper face of a third bottom part 32, the width from the lower end of the first outer oblique part 142 to the lower edge of the third oblique part 33 that opposes the third oblique part 33 overlapped by the first oblique part 142 is preferably smaller than the width of a third bottom part 32 located along the outer edge on the first member 10D side.

The height of the upper edge of a third oblique part 33 located along the outer edge on the first member 10D side is preferably smaller than the height of the upper edge of a first outer oblique part 142.

The height of the upper edge of a third oblique part 33 is preferably equal to the height of the upper edge of a first oblique part 13.

Setting the relationships among the widths and among the heights as described above can reduce luminance non-uniformity when using the partitioning member 1D as a reflector of a planar light source.

Planar Light Source

Arranging light sources and any of the partitioning members described above on a substrate can construct a planar light source. Here, a planar light source will be explained using the partitioning member 1 as an example. However, in place of the partitioning member 1, any of the partitioning members 1A to 1D may be used.

Figure 16:
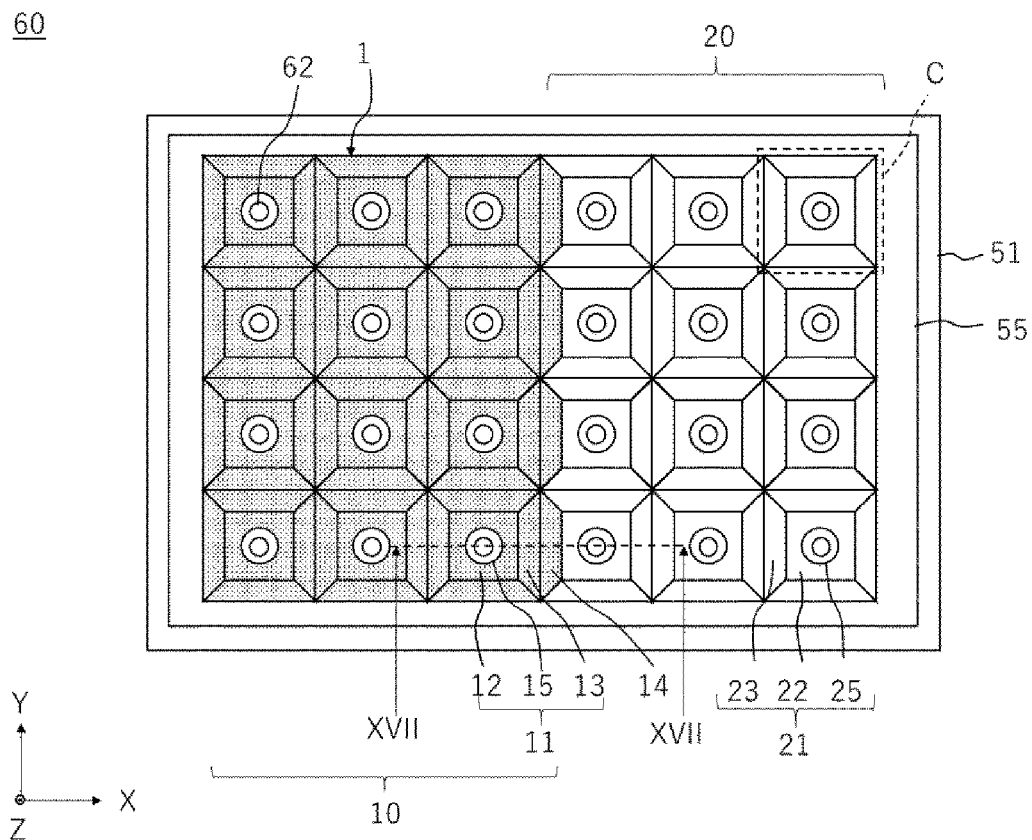
FIG. 16 is a top view illustrating a planar light source according to a first embodiment.
Figure 17:
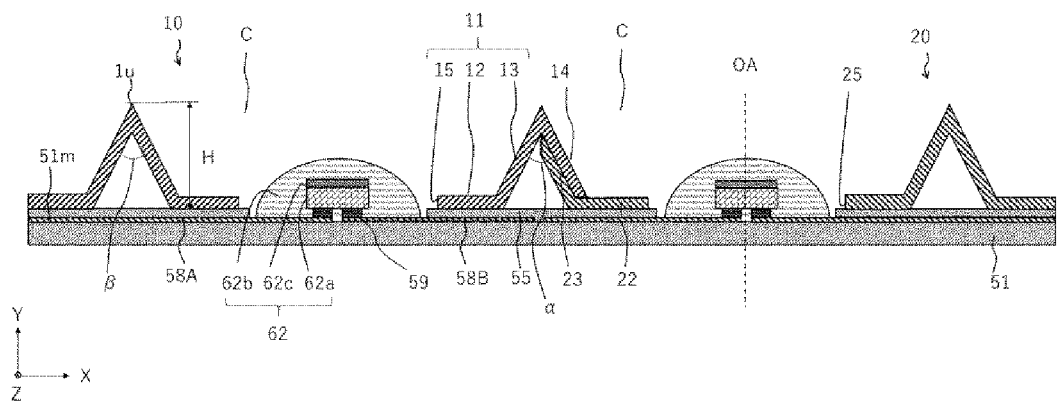
FIG. 17 is a cross-sectional view taken along line XVII-XVII in FIG. 16.

FIG. 16 is a top view illustrating a planar light source according to a first embodiment. FIG. 17 is a cross-sectional view taken along line XVII-XVII in FIG. 16. As shown in FIG. 16 and FIG. 17, a planar light source 60 is a surface-emitting type light emitting device having a substrate 51, a cover member 55, a partitioning member 1, and a plurality of light sources 62. In the example shown in FIG. 17, the cover member 55 covers at least some portions of the upper face of the substrate 51, and the partitioning member 1 is disposed on the substrate 51 via the cover member 55. The cover member 55 is provided as needed.

In the partitioning member 1, each of the regions surrounded by the first oblique parts 13, the regions surrounded by a first outer oblique part 14 and the second oblique regions 23, or the regions surrounded by the second oblique regions 23 is designated as a section C. The upper edge of each oblique part is designated as $1u$. Thus, when viewed from above, the border between two adjacent sections C can be considered as an upper edge $1u$. The partitioning member 1 is preferably a member having reflectivity.

In the planar light source 60, the lower faces of the first bottom parts 12 and the lower faces of the second bottom parts 22 can be bonded to the cover member 55 provided on the substrate 51. In the example shown in FIG. 17, the lower faces of the first bottom parts 12 and the lower faces of the second bottom parts 22 are indirectly bonded to the substrate 51 via the cover member 55.

In the planar light source 60, the light sources 62 are disposed on the substrate 51 exposed in the light source disposition openings 15 of the first bottom parts 12 and the light source disposition openings 25 of the second bottom parts 22. The planar light source 60 will be explained in detail below.

Substrate 51

A substrate 51 is a member for mounting the light sources 62. Conductor wiring 58A and 58B for supplying power to the light sources 62 are provided on the upper face $51m$ of the substrate 51. A cover member 55 preferably covers the regions of the conductor wiring 58A and 58B where no electrical contact is made with the light emitting elements.

The material for the substrate 51 has only to be able to at least isolate a pair of conductor wiring 58A and 58B, and examples include ceramics, resins, and composite materials. Examples of resins include phenol resins, epoxy resins, polyimide resins, BT resins, polyphthalamide (PPA), polyethylene terephthalate (PET), and the like. Examples of composite materials include those made by combining an inorganic filler, such as glass fiber, $SiO_2$, $TiO_2$, $Al_2O_3$, or the like with the resins described above, glass fiber reinforced resins (glass epoxy resins), and metal substrates made by covering a metal material with an insulation layer.

The thickness of the substrate 51 can be suitably selected. The substrate 51 can be a flexible substrate manufacturable by roll-to-roll processing, or a rigid substrate. A rigid substrate may be a bendable thin rigid substrate. No particular restriction applies to the material for the conductor wiring 58A and 58B as long as it is a conductive material, and any of those normally used as a wiring layer for circuit boards or the like can be used. A light reflecting film or the like may be provided on the surfaces of the conductor wiring 58A and 58B.

The cover member 55 is preferably made of insulation material. Examples of materials for the cover member 55 include those similar to the materials listed for the substrate 51. Using a material made by adding a white filler or the like to any of the resins described above for the cover member 55 allows the cover member to reflect the outgoing light from the light sources 62, thereby increasing the light extraction efficiency of the planar light source 60.

Light Source 62

A light source 62 is a member that emits light, and in the example shown in FIG. 17, it is a light emitting element encapsulated by a light transmissive resin. The shape of the light transmissive resin, for example, is substantially hemispherical. The light transmissive resin material is, for example, a silicone resin. The light transmissive resin may contain a phosphor and/or diffuser, or not. A light source 62 is not limited to this. It may be a self-emitting light emitting element itself, or one made by sealing a light emitting element housed in a recess of a resin molded part with a light transmissive material. It may be composed of a resin containing a light reflecting material surroundings the lateral faces of a light emitting element and a light transmissive member that covers the upper face of the light emitting element and the upper face of the resin containing a light reflecting material. It may be composed of a light transmissive member that covers the upper face of a light emitting element and a resin containing a light reflecting material surroundings the lateral faces of the light emitting element and the lateral faces of the light transmissive member. The light transmissive member may contain a phosphor. A light transmissive adhesive may be applied between the light emitting element and the light transmissive member for bonding the light emitting element and the light transmissive member.

A light source 62 preferably has wide distribution in order to allow each section C surrounded by the oblique parts of the partitioning member 1D to light with minimal luminance non-uniformity. Particularly, each of the light sources 62 preferably has batwing distribution characteristics. This can reduce the amount of the light exiting each light source 62 directly upward to broaden the light distribution while allowing the light to irradiate on the oblique parts and the bottom part, thereby reducing luminance non-uniformity in each section C surrounded by the oblique parts.

Here, batwing distribution characteristics refer to the light distribution characteristics defined by the emission intensity distribution in which the emission intensity is higher at an absolute value angle greater than 0 degrees assuming that the optical axis OA is 0 degrees. The optical axis OA, as shown in FIG. 17, is defined as the line that passes the center of the light source 62 and is perpendicular to the upper face 51m of the substrate 51.

One example of the light source 62 having batwing distribution characteristics, in particular, uses a light emitting element 62a having a light reflecting film 62c on the upper face thereof as shown in FIG. 17. The light reflecting film 62c provided on the upper face of the light emitting element 62a can reduce the amount of the light directly above the light emitting element 62a by reflecting most of the light exiting the light emitting element 62a upward thereby achieving batwing distribution characteristics. A lens may be separately combined to achieve batwing distribution.

The light reflecting film 62c can be a metal film, such as silver, copper, or the like, a resin containing a white filler, or a combination of these. The light reflecting film 62c may be a dielectric multilayer film (DBR) having an incident angle dependent reflectance with respect to the wavelength of the light from the light emitting element 62a. Specifically, the reflectance of the light reflecting film 62c is preferably set lower for oblique incidence than perpendicular incidence. This can moderate the luminance change directly above the light emitting element 62a, suppressing the area directly above the light emitting element 62a from becoming extremely less luminous, such as becoming a dark spot.

The thickness of the light emitting element 62a can be 100 μm to 500 μm. The thickness of the light reflecting film 62c can be, for example, 0.1 μm to 3.0 μm. The thickness of the light source even when including an encapsulating member can be set as about 0.5 mm to about 2.0 mm.

The light sources 62 are preferably wired on the substrate 51 to be drivable independently from one another, and to allow for dimming control (e.g., local dimming or high dynamic range) per light source 62.

Light Emitting Element 62a

A light emitting element 62 includes a semiconductor structure. The semiconductor structure includes an n-side semiconductor layer, a p-side semiconductor layer, and an active layer interposed between the n-side semiconductor layer and the p-side semiconductor layer. The active layer may be a single quantum well (SQW) structure or a multiple quantum well (MQW) structure including a plurality of well layers. The semiconductor structure includes a plurality of semiconductor layers made of nitride semiconductors. Nitride semiconductors include semiconductors of all compositions obtained by varying the composition ratio x and y within their ranges in the chemical formula $In_xAl_yGa_{1-x-y}N$ ($0 \leq x \leq 1$, $0 \leq y \leq 1$, $x+y \leq 1$). The peak wavelength of the light emitted by the active layer can be suitably selected in accordance with the purpose. The active layer is constructed to be able to emit visible light or ultraviolet light, for example.

The semiconductor structure may include multiple light emitting parts each including an n-side semiconductor layer, an active layer, and a p-side semiconductor layer. When the semiconductor structure includes multiple light emitting parts, the well layers in the light emitting parts may emit light having different peak emission wavelengths or the same peak emission wavelength. The same peak emission wavelength may include a variation of about several nanometers. A combination of peak emission wavelengths of the light from such light emitting parts can be suitably selected. For example, in the case where the semiconductor structure includes two light emitting parts, combinations of the light emitted by the light emitting parts include blue light and blue light, green light and green light, red light and red light, ultraviolet light and ultraviolet light, blue light and green light, blue light and red light, green light and red light, or the like. For example, in the case where the semiconductor structure includes three light emitting parts, combinations of the light emitted by the light emitting parts include blue light, green light, and red light. Each light emitting part may include one or more well layers emitting light having different peak emission wavelengths from that of the light from other well layers.

A bonding member 59 is for bonding the light sources 62 to the conductor wiring, for example, a conductive member. Specific examples include, Au-containing alloys, Ag-containing alloys, Pd-containing alloys, In-containing alloys, Pb—Pd-containing alloys, Au—Ga-containing alloys, Au—

Sn-containing alloys, Sn-containing alloys, Sn—Cu-containing alloys, Sn—Cu—Ag-containing alloys, Au—Ge-containing alloys, Au—Si-containing alloys, Al-containing alloys, Cu—In-containing alloys, metal flux mixtures, and the like.

Partitioning Member 1

A partitioning member 1 is disposed on the substrate 51. The partitioning member 1 may be disposed on the upper face of the substrate 51 or disposed thereon via a cover member 55 disposed on the upper face on the substrate 51.

In the partitioning member 1, each of the light source disposition openings (the light source disposition openings 15 and 25) is located in the central part of each section C when viewed from above. The shape and size of each light source disposition opening have only to be those that expose a light source 62 in whole, and are preferably set to be positioned in the vicinity of the light source 62. This allows each of the bottom parts (the first bottom parts 1b, and the second bottom parts 2b) to also reflect the light from the respective light source 62, thereby improving the light extraction efficiency.

The angles formed by two oblique parts connected at the upper edges ($\alpha$ and $\beta$ in FIG. 17) are preferably set to 60 to 90 degrees, for example. Setting the angles to fall within such a range can reduce luminance non-uniformity among the sections.

The pitch between the upper edges 1u of the oblique parts of the partitioning member 1 can be suitably adjusted depending on the intended planar light source size, or the like. The pitch can be, for example, 1 mm to 50 mm, preferably 5 mm to 20 mm, more preferably 6 mm to 15 mm.

The height H of the partitioning member 1 itself, i.e., the distance from the lower face of the bottom parts to the upper edges 1u of the partitioning member 1, is preferably 8 mm or smaller, and is preferably set to about 1 mm to about 4 mm in the case of producing a thinner planar light source.

The upper faces of the first bottom parts 12 and the second bottom parts 22 may be flat or rough. Furthermore, the upper face of each bottom part may be provided with projected parts projecting upward from the upper face of the bottom part. The projected parts have light reflectivity. This allows the projected parts to reflect the light from the light sources upward, thereby reducing luminance non-uniformity in each section.

The projected parts, in the case of a square bottom part, are provided at four corners, for example. The number of projected parts provided at each of the four corners of a bottom part may be one or more.

The upper edge of each projected part is preferably lower than the upper edge of each oblique part, and higher than the upper face of a light emitting element.

The shape of each projected part, for example, is conical.

The material for the projected parts may be the same as or different from the material for the partitioning member.

The partitioning member 1 is preferably bonded to the substrate by using an adhesive member. This can reduce the misalignment of the partitioning member 1. A light reflecting adhesive member can be used to seal around each light source disposition opening in the partitioning member 1 so as not to allow the outgoing light from the light sources to enter between the substrate 51 and the partitioning member 1. More preferably, for example, a ring shaped light reflecting adhesive member is disposed along the outer edge of each light source disposition opening. The adhesive member may be a double coated tape, for example, a PET base material having an acrylic resin based pressure sensitive adhesive on both sides, a hot melt adhesive sheet, or an adhesive made of a thermosetting or thermoplastic resin. These adhesive members are preferably highly fire retardant materials. Alternatively, screws, pins, or the like may be utilized to bond the partitioning member 1 to the substrate.

The partitioning member 1 may be formed by using a resin containing a reflecting material such as particles of titanium oxide, aluminum oxide, or silicon oxide, or formed by using a resin not containing a reflecting material and disposing a reflective material on the surface. Alternatively, a resin containing micro air bubbles may be used. Examples of resins used as the partitioning member 1 include thermoplastic resins, such as acrylic resins, polycarbonate resins, cyclic polyolefin resins, polyethylene terephthalate (PET), or polyester, and thermosetting resins such as epoxy resins or silicone resins. For the partitioning member 1, the reflectance is preferably set as 70% or higher with respect to the light exiting from the light sources 62.

For the partitioning member 1, the first member 10 and the second member 20 may be formed by employing a forming method which uses a die or by stereolithography, or the partitioning member 1 may be prepared through a purchase. For the forming method which uses a die, injecting molding, extruding, compression molding, vacuum forming, pressing, or the like is applicable. For example, a first member 10 and a second member 20 in which bottom parts and oblique parts are integrally formed can be obtained by vacuum forming using a reflective sheet made of PET or the like. The first outer oblique parts 14 of the first member can be integrally formed with the first bottom parts 12 and the first oblique parts 13. When forming the oblique parts, the projected parts described above can be formed simultaneously with the oblique parts.

The planar light source 60 may include an optical member disposed above the light sources 62 while interposing the partitioning member 1. The optical member is, for example, a diffusion sheet. Providing the planar light source 60 with a diffusion sheet can improve the uniformity of the light that transmitted through the diffusion sheet. Moreover, the planar light source 60 may further include above the diffusion sheet at least one selected from the group consisting of a wavelength conversion sheet, a prism sheet, a polarization sheet, a brightness enhancement sheet, and a color filter. Providing the planar light source 60 with one or more of these optical members can further improve the uniformity of the light that transmitted through the diffusion sheet. A prism sheet has a plurality of prisms arranged in a predetermined direction on the surface. A prism sheet, for example, is a stack of a layer having a plurality of prisms along the Y direction and a layer having a plurality of prisms along the X direction when viewing the sheet plane in the X direction and the Y direction orthogonal to the X direction.

The first embodiment has been explained using the example in which the top view shape of a partitioned part is quadrangular. The shape is not limited to this, and the top view shape of a partitioned part may be hexagonal.

Second Embodiment

As a second embodiment, an example of a liquid crystal display device using a planar light source as a backlight light source will be described.

Figure 18:
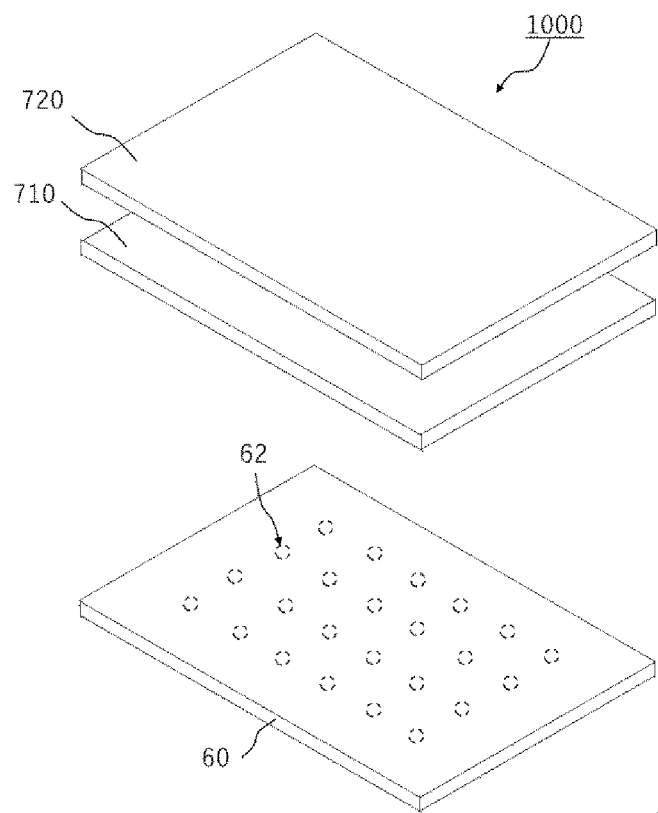
FIG. 18 is a diagram illustrating the constituents of a liquid crystal display device according to a second embodiment.

FIG. 18 is a diagram illustrating the constituents of a liquid crystal display device according to a second embodiment. As shown in FIG. 18, the liquid display device 1000 includes, successively from the top, a liquid crystal panel 720, an optical sheet 710, and a planar light source 60.

The liquid crystal display device 1000 is a so-called direct lit liquid crystal display device in which the planar light source 60 is behind the liquid crystal panel 720. In the liquid crystal display device 1000, the light exiting the planar light source 60 irradiates on the liquid crystal panel 720.

From the thickness reduction standpoint, the thickness of the planar light source can be set to 15 mm or smaller. This can reduce the thickness of the planar light source, thereby reducing the thickness of the liquid crystal display device 1000.

The use of the planar light source 60 is not limited to that as the backlight of the liquid crystal display device 1000. The planar light source 60 can be utilized as a backlight of a television, tablet, smartphone, smartwatch, head-up display, digital signage, billboard, and the like. Furthermore, the planar light source 60 can be utilized as a light source for a lighting fixture, emergency light, or line light, as well as for various illumination applications and automotive installations.

What is claimed is:

1. A planar light source comprising:
   a plurality of light sources;
   a substrate; and
   a partitioning member, the partitioning member including
   a first member having first partitioned parts arranged on the substrate in a first matrix each having a first bottom part and first oblique parts surrounding the first bottom part, and
   a second member having second partitioned parts arranged on the substrate in a second matrix each having a second bottom part and second oblique parts surrounding the second bottom part,
   the first member further having first outer oblique parts connected to upper edges of the first oblique parts located along an outer edge on a second member side and overlapping the second oblique parts located along an outer edge on a first member side,
   the first bottom parts and the second bottom parts each having a light source disposition opening, and
   the light sources being individually disposed on the substrate and exposed in the light source disposition openings,
   wherein the second oblique parts are located under the first outer oblique parts, and
   wherein a height of an upper edge of at least one of the second oblique parts located along the outer edge on the first member side is lower than a height of an upper edge of at least one of the first outer oblique parts,
   wherein at least one of the first outer oblique parts has a first surface, a second surface opposite to the first surface, and a third surface directly next to the first surface and the second surface, and
   wherein the first surface and the third surface are in surface-to-surface contact with the second member.

2. The planar light source according to claim 1, wherein a lower end of at least one of the first outer oblique parts is in contact with an upper face of at least one of the second bottom parts.

3. The planar light source according to claim 1, wherein a distance between upper edges of two opposing first oblique parts that interpose a first bottom part in a cross section is equal to a distance between an upper edge of one of the first outer oblique parts and an upper edge of one of the second oblique parts that opposes one of the second oblique parts overlapped by the one of the first outer oblique parts.

4. The planar light source according to claim 1, wherein a width from a lower end of each one of the first outer oblique parts to a lower edge of one of the second oblique parts that opposes one of the second oblique parts overlapped by the each one of the first outer oblique parts in a cross section is equal to a width of each first bottom part.

5. The planar light source according to claim 1, wherein the first member has first connecting oblique parts each connected to both of the first outer oblique parts that are adjacent to one another and overlapping the second oblique parts adjacent to the second oblique parts located under the first outer oblique parts.

6. The planar light source according to claim 1, wherein the partitioning member further includes a third member having third partitioned parts arranged on the substrate in a third matrix each having a third bottom part and third oblique parts surrounding the third bottom part,
the second member further has second outer oblique parts connected to upper edges of the second oblique parts located along an outer edge on a third member side and overlapping the third oblique parts located along an outer edge on a second member side,
the third bottom parts each have a light source disposition opening, and
the light sources are individually disposed on the substrate and exposed in the light source disposition openings.

7. The planar light source according to claim 1, wherein the partitioning member further includes a third member having third partitioned parts arranged on the substrate in a third matrix each having a third bottom part and third oblique parts surrounding the third bottom part,
the third member further has third outer oblique parts connected to upper edges of the third oblique parts located along an outer edge on a second member side and overlapping the second oblique parts located along an outer edge on a third member side,
the third bottom parts each have a light source disposition opening, and
the light sources are individually disposed on the substrate and exposed in the light source disposition openings.

8. The planar light source according to claim 1, wherein the partitioning member further includes a third member having third partitioned parts arranged on the substrate in a third matrix each having a third bottom part and third oblique parts surrounding the third bottom part,
the first member further has first outer oblique parts connected to upper edges of the first oblique parts located along an outer edge on a third member side and overlapping the third oblique parts located along the outer edge on the first member side,
the third bottom parts each have a light source disposition opening, and
the light sources are individually disposed on the substrate and exposed in the light source disposition openings.

9. The planar light source according to claim 1, wherein the first outer oblique parts overlap a portion of the second member, and wherein the first outer oblique parts are in contact with the overlapped parts of the second member in part or whole.

10. The planar light source according to claim 1, wherein the first member further comprises first connecting oblique parts, wherein the first connecting oblique parts are connected to both first outer oblique parts that are adjacent to one another, and wherein the first connecting oblique parts are laid over the second oblique parts adjacent to the second oblique parts located under the first outer oblique parts.

11. The planar light source according to claim 1,
wherein the first member further comprises first projected parts in the first outer oblique parts, wherein the first projected parts project in the X− direction from faces of the first outer oblique parts that oppose the second oblique parts overlapped by the first outer oblique parts, wherein the second member further comprises second projected parts in the second oblique parts located along outer edge on the first member, wherein the second projected parts project in the X+ direction from the second oblique parts that oppose the first outer oblique parts, and wherein the first projected parts are interposed between the second projected parts and the second bottom parts.

12. A planar light source comprising:
a plurality of light sources;
a substrate; and
a partitioning member, the partitioning member including
a first member having first partitioned parts arranged on the substrate in a first matrix each having a first bottom part and first oblique parts surrounding the first bottom part, and
a second member having second partitioned parts arranged on the substrate in a second matrix each having a second bottom part and second oblique parts surrounding the second bottom part,
the first member further having first outer oblique parts connected to upper edges of the first oblique parts located along an outer edge on a second member side and overlapping the second oblique parts located along an outer edge on a first member side,
the first bottom parts and the second bottom parts each having a light source disposition opening, and
the light sources being individually disposed on the substrate and exposed in the light source disposition openings, wherein
a height of an upper edge of each of the second oblique parts located along the outer edge on the first member side is lower than a height of an upper edge of each of the first outer oblique parts,
wherein at least one of the first outer oblique parts has a first surface, a second surface opposite to the first surface, and a third surface directly next to the first surface and the second surface, and
wherein the first surface and the third surface are in surface-to-surface contact with the second member.

13. The planar light source according to claim 12, wherein a lower end of at least one of the first outer oblique parts is in contact with an upper face of at least one of the second bottom parts.

14. The planar light source according to claim 12, wherein a distance between upper edges of two opposing first oblique parts that interpose a first bottom part in a cross section is equal to a distance between an upper edge of one of the first outer oblique parts and an upper edge of one of the second oblique parts that opposes one of the second oblique parts overlapped by the one of the first outer oblique parts.

15. The planar light source according to claim 12, wherein a width from a lower end of each one of the first outer oblique parts to a lower edge of one of the second oblique parts that opposes one of the second oblique parts overlapped by the each one of the first outer oblique parts in a cross section is equal to a width of each first bottom part.

16. The planar light source according to claim 12, wherein the first member has first connecting oblique parts each connected to both of the first outer oblique parts that are adjacent to one another and overlapping the second oblique parts adjacent to the second oblique parts located under the first outer oblique parts.

17. The planar light source according to claim 12, wherein the partitioning member further includes a third member having third partitioned parts arranged on the substrate in a third matrix each having a third bottom part and third oblique parts surrounding the third bottom part,
the second member further has second outer oblique parts connected to upper edges of the second oblique parts located along an outer edge on a third member side and overlapping the third oblique parts located along an outer edge on a second member side,
the third bottom parts each have a light source disposition opening, and
the light sources are individually disposed on the substrate and exposed in the light source disposition openings.

18. The planar light source according to claim 12, wherein the partitioning member further includes a third member having third partitioned parts arranged on the substrate in a third matrix each having a third bottom part and third oblique parts surrounding the third bottom part,
the third member further has third outer oblique parts connected to upper edges of the third oblique parts located along an outer edge on a second member side and overlapping the second oblique parts located along an outer edge on a third member side,
the third bottom parts each have a light source disposition opening, and
the light sources are individually disposed on the substrate and exposed in the light source disposition openings.

19. The planar light source according to claim 12, wherein the partitioning member further includes a third member having third partitioned parts arranged on the substrate in a third matrix each having a third bottom part and third oblique parts surrounding the third bottom part,
the first member further has first outer oblique parts connected to upper edges of the first oblique parts located along an outer edge on a third member side and overlapping the third oblique parts located along the outer edge on the first member side,
the third bottom parts each have a light source disposition opening, and
the light sources are individually disposed on the substrate and exposed in the light source disposition openings.

20. The planar light source according to claim 12, wherein the first outer oblique parts overlap a portion of the second member, and wherein the first outer oblique parts are in contact with the overlapped parts of the second member in part or whole.

21. The planar light source according to claim 12,
wherein the first member further comprises first projected parts in the first outer oblique parts, wherein the first projected parts project in the X− direction from faces of the first outer oblique parts that oppose the second oblique parts overlapped by the first outer oblique parts, wherein the second member further comprises second projected parts in the second oblique parts located along outer edge on the first member, wherein the second projected parts project in the X+ direction from the second oblique parts that oppose the first outer oblique parts, and wherein the first projected parts are interposed between the second projected parts and the second bottom parts.

22. A planar light source comprising:
a plurality of light sources;
a substrate; and
a partitioning member, the partitioning member including
   a first member having first partitioned parts arranged on the substrate in a first matrix each having a first bottom part and first oblique parts surrounding the first bottom part, and
   a second member having second partitioned parts arranged on the substrate in a second matrix each having a second bottom part and second oblique parts surrounding the second bottom part,
      the first member further having first outer oblique parts connected to upper edges of the first oblique parts located along an outer edge on a second member side and overlapping the second oblique parts located along an outer edge on a first member side,
      the first bottom parts and the second bottom parts each having a light source disposition opening, and
      the light sources being individually disposed on the substrate and exposed in the light source disposition openings,
wherein the second oblique parts are located under the first outer oblique parts, and
wherein a height of an upper edge of at least one of the second oblique parts located along the outer edge on the first member side is lower than a height of an upper edge of at least one of the first outer oblique parts, wherein the first outer oblique parts are bonded to the second member with an adhesive member.

23. A planar light source comprising:
a plurality of light sources;
a substrate; and
a partitioning member, the partitioning member including
   a first member having first partitioned parts arranged on the substrate in a first matrix each having a first bottom part and first oblique parts surrounding the first bottom part, and
   a second member having second partitioned parts arranged on the substrate in a second matrix each having a second bottom part and second oblique parts surrounding the second bottom part,
      the first member further having first outer oblique parts connected to upper edges of the first oblique parts located along an outer edge on a second member side and overlapping the second oblique parts located along an outer edge on a first member side,
   the first bottom parts and the second bottom parts each having a light source disposition opening, and
   the light sources being individually disposed on the substrate and exposed in the light source disposition openings, wherein
a height of an upper edge of each of the second oblique parts located along the outer edge on the first member side is lower than a height of an upper edge of each of the first outer oblique parts, wherein the first outer oblique parts are bonded to the second member with an adhesive member.

* * * * *